VOICE OPERATED SYSTEM

Filed July 8, 1964 4 Sheets-Sheet 1

INVENTOR.
REYNOLD B. JOHNSON
BY John H. Holcombe
ATTORNEY

VOICE OPERATED SYSTEM

Filed July 8, 1964 4 Sheets-Sheet 3

July 9, 1968 R. B. JOHNSON 3,392,239

VOICE OPERATED SYSTEM

Filed July 8, 1964 4 Sheets-Sheet 4

United States Patent Office 3,392,239
Patented July 9, 1968

3,392,239
VOICE OPERATED SYSTEM
Reynold B. Johnson, Palo Alto, Calif., assignor to International Business Machines Corporation, New York, N.Y., a corporation of New York
Filed July 8, 1964, Ser. No. 381,023
11 Claims. (Cl. 179—1)

ABSTRACT OF THE DISCLOSURE

In a voice operated typewriter system, the output of the voice recognition circuitry is used to select from among a plurality of slides, the slide corresponding to the sound spoken. The slide is used to display all the possible words represented by the sound, enabling the operator to select from among those displayed the intended word.

The present invention relates to voice operated systems and, more particularly, to a system for resolving and interpreting vocal utterances and controlling further apparatus in response to such interpretations.

At the present state of the art, it has been extremely difficult to design a machine capable of recognizing spoken words from among a large vocabulary with a high degree of accuracy. Because of this, previous speech recognition machines have been restricted to very small vocabularies. For example, speech recognition systems used to operate typewriters have been limited to either phonetic spelling of pronounced words or to a very few words. Even if perfect speech recognition circuitry were developed to analyze vocal sound, difficulty would be encountered with respect to different words having identical pronunciation, such as "to," "two," "2," "II," and "too."

In most environments where speech recognition systems may be used advantageously, for instance, typewriters, control systems, and the preparation of data for entry into data processing systems, it is necessary for the voice recognition system to have a relatively extensive vocabulary, i.e., over 100 words. Therefore, the prior speech recognition systems with their limited vocabulary have not met with success in such applications.

It is therefore an object of the present invention to provide a novel system for resolving and interpreting vocal utterances.

Another object of the present invention is to provide a speech recognition system having a high reliability in recognizing individual spoken words out of a large vocabulary.

A further object of the present invention is to provide a speech recognition system which allows an operator to select an intended word from among a number of words having the same or similar pronunciations.

A still further object of the present invention is to provide a speech recognition system allowing an operator to pronounce a single vocal utterance or word to obtain the opportunity to select a complete phrase, sentence, or paragraph as his intended instruction.

In accordance with the present invention, therefore, there is provided apparatus for analyzing sound waves and reaching a single decision in response to such sound waves, display apparatus for providing, in response to such decision, a visual display of various words, phrases, etc., and means to allow an operator to select a desired word, phrase, etc., from among those displayed.

A feature of the present invention is that an operator, by voicing a particular word, may call up for viewing things other than interpretations of the voice word. For example, the word "three" may call forth for viewing a "Standard Paragraph No. 3," "Standard Letter No. 3," etc.

The foregoing and other objects, features and advantages of the invention will be apparent from the following more particular description of a preferred embodiment of the invention, as illustrated in the accompanying drawings.

Figure 1:
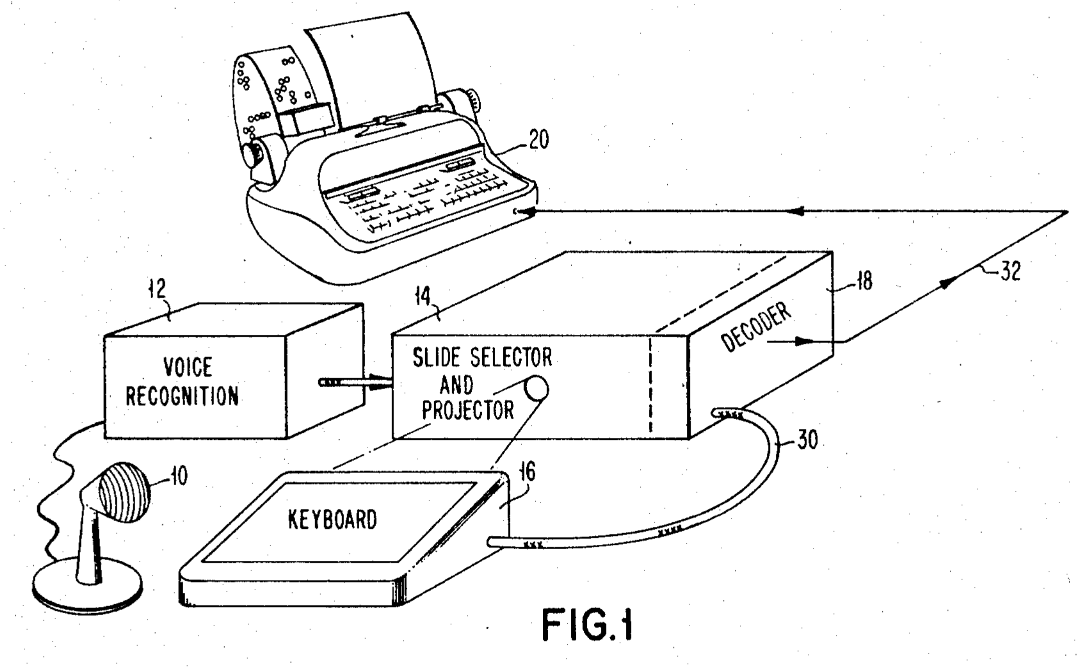
FIG. 1 is a perspective diagram of the overall system comprising the present invention.
Figure 2:
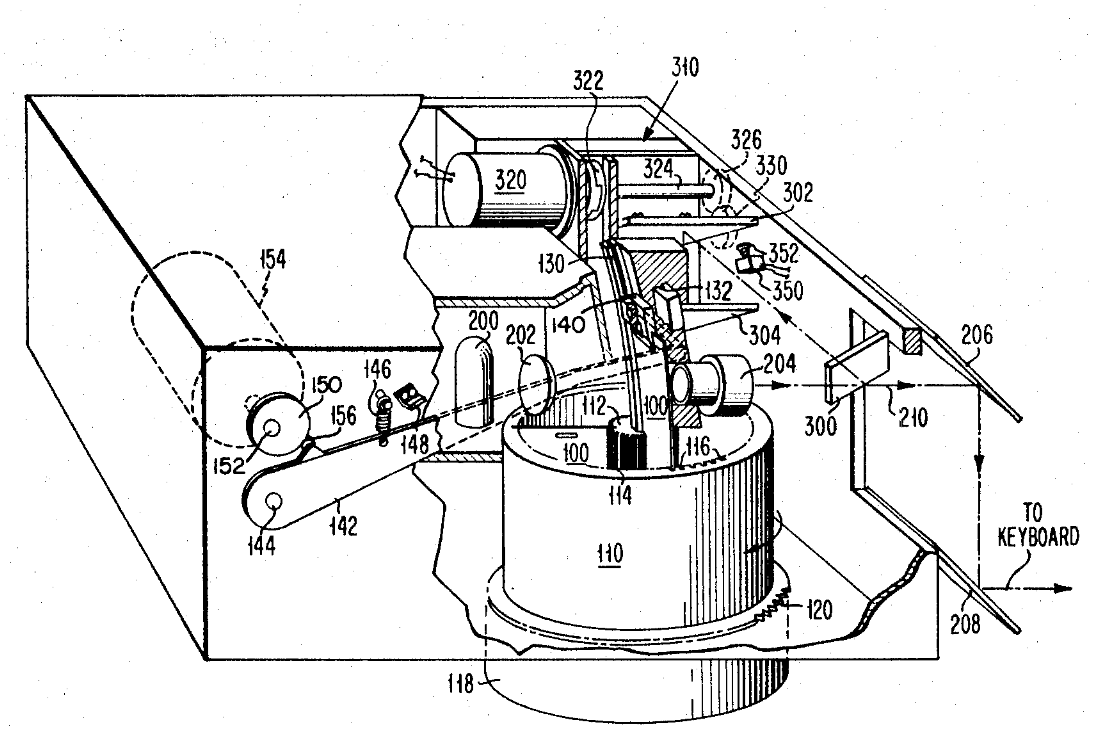
FIG. 2 is a partially cut-away perspective view of the slide selector and projector 14, and decoder 18 of FIG. 1.
Figure 3:
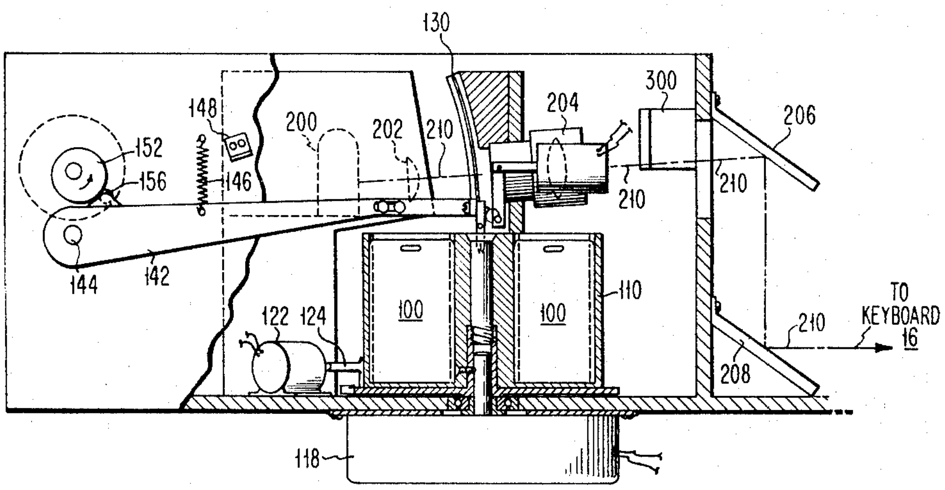
FIG. 3 is a cut-away side view of the apparatus of FIG. 2.
Figure 4:
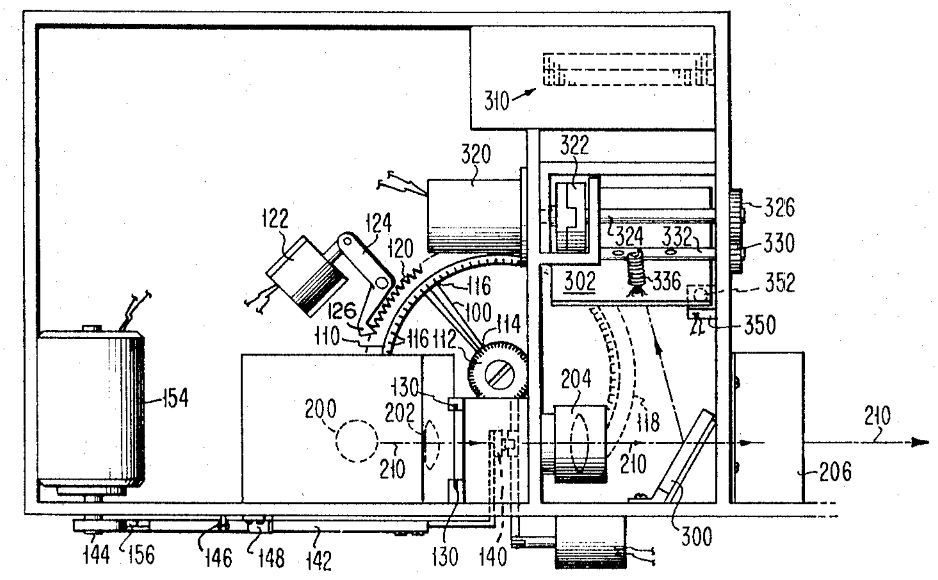
FIG. 4 is a cut-away top view of the apparatus of FIG. 2.
Figure 5:
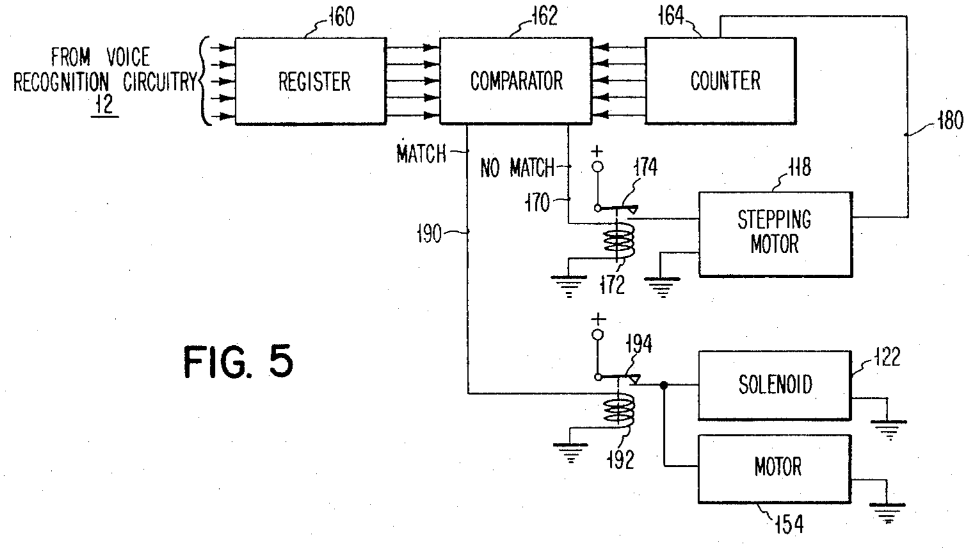
Figure 8:
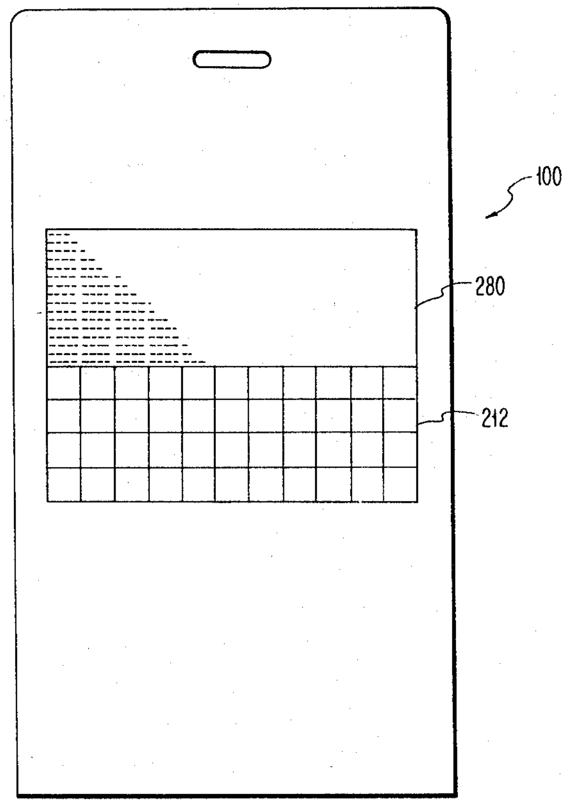
Figure 7:
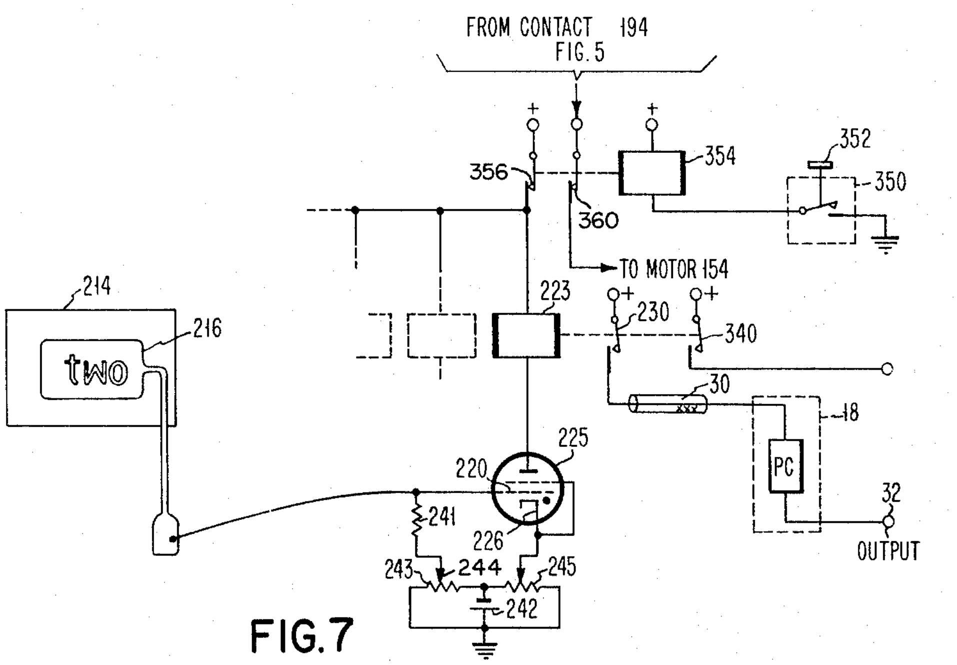
Figure 6:
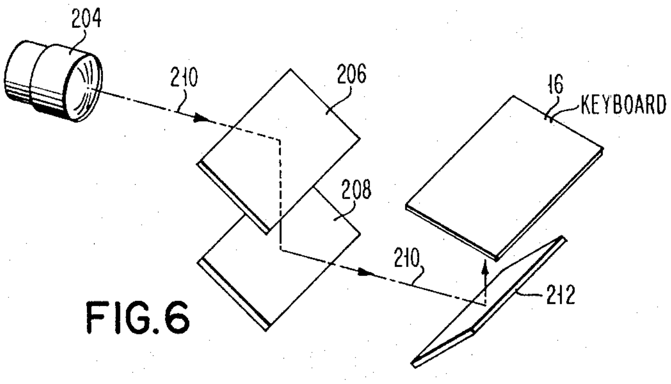
Figure 9:
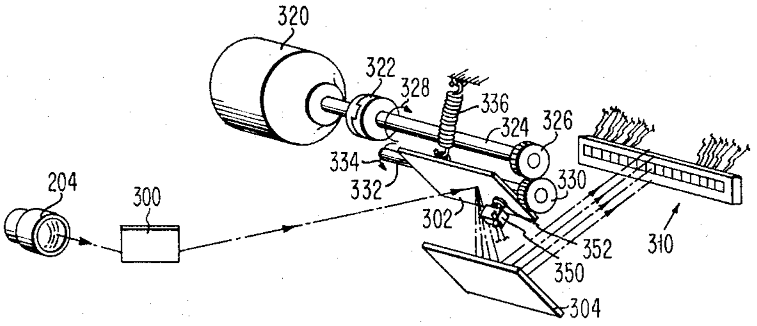

FIG. 5 is a schematic diagram of the circuitry for operating motors 118 and 154 of FIGS. 2 through 4;

FIG. 6 is a perspective diagram of the optical path for slide projector 14 and keyboard 16 of FIG. 1;

FIG. 7 is a schematic diagram of a portion of the circuitry for keyboard 16 and decoder 18 of FIG. 1;

FIG. 8 is a frontal view of a microfilm slide used in slide selector and projector 14 of FIG. 1; and FIG. 9 is a perspective diagram of the optical path for slide projector 14 and decoder 18 of FIG. 1.

Referring to FIG. 1, there is shown a simplified, perspective view of a speech recognition system in accordance with the invention, including a typing unit for accepting the output of the system. The operator speaks into a microphone 10, which converts his vocal utterance into electric signals which are supplied to voice recognition circuitry 12. The voice recognition circuitry analyzes the incoming electrical signals and reaches a single decision in response to such electrical signals. The decision reached is communicated by electrical code to slide selector and projector 14. The code causes the slide selector to select one of a plurality of slides and project, from one part of the slide, an image of a keyboard onto the bottom side of glass sheet 16. The resultant keyboard provides a visual display of various words, phrases, and/or paragraphs at various points on the glass sheet. The operator then selects a desired word, phrase, or paragraph from among those displayed by touching the glass sheet within the display of the desired word, etc. Touching such a selected part of the glass sheet activates a corresponding sensing means and decoder 18. The selected sensing means then reads optically digital data projected by projector 14 from a second part of the selected slide, and converts the optical data into a coded electrical output which is supplied to typewriter 20. The typewriter responds to the coded signals and thereby types the selected word, phrase, or paragraph.

Thus, an operator speaks into microphone 10, voice recognition circuitry 12 deciphers the signal received from the microphone and makes a "best guess" as to what the operator said and transmits a coded representation of its choice to slide selector and projector 14 which projects a keyboard onto glass sheet 16. Thereupon, the operator touches the desired key, actuating decoder 18 to provide a coded output representative of the selected key which causes typewriter 20 to type out the data selected by the operator.

In addition to having keys represent words, phrases, or paragraphs, keys may be made to represent entire standard letters. For example, when the operator speaks the word "two," one of the keys of the keyboard called forth may say "Standard Letter No. 2." In this manner, upon touching that key, the letter will be typed at the speed presented by the decoder 18, which is substantially faster than that of the average typist. Therefore, a person having no typing ability is capable of producing typewritten matter at a faster rate than trained typists.

Still referring to FIG. 1, a microphone 10 may be any microphone which is responsive to the human voice and provides an electrical signal that is a true representation of the human voice received. "Human voice" means not only low frequency voiced sounds, such as "*ă*," "*bĕ*," etc., but also so-called "frictional" sounds such as "*ff*," "*ss*," etc., which are of a high frequency.

The electrical signals from microphone 10 are supplied to voice recognition circuitry 12. This circuitry may be any sound analyzing circuitry which is capable of analyzing at least a single syllable of each of a number of spoken words and provides an output indicating its recognition of such syllable. An example of voice recognition circuitry fitting the above qualifications is copending application Ser. No. 52,548, filed Aug. 29, 1960, entitled "Sound Analyzing System," and assigned to a common assignee. Specifically, that circuitry is capable of categorizing a number of vocal sounds into ten separate categories. Upon accomplishing such categorization, the circuit provides an output signal on the one of ten lines representing such category.

The ten lines from voice recognition circuitry 12 are connected to slide selector and projector 14. The activated line causes the slide selector to select the slide corresponding to such line and withdraw that slide from storage so that the keyboard microfilmed thereon may be projected onto glass sheet 16.

Referring to FIGS. 2, 3 and 4, there is shown an embodiment of slide selector and projector 14 of FIG. 1.

Microfilm slides 100 are stored in drum 110 in a radial array about center post 112. Each microfilm slide is individually held by a groove 114 in center post 112 and by a groove 116 in drum 110. A stepping motor 118 may be selectively activated so as to rotate drum 110 and center post 112 in a clockwise direction as viewed from above (see arrow). Drum 110 is provided with a series of teeth 120 about its periphery. A bell crank 124 is provided having a single tooth 126 which mates with gear 120. The bell crank is actuated by a solenoid 122 when motor 118 ceases rotating drum 110, thereby exactly positioning drum 110 so that grooves 114 and 116 are precisely aligned with groove 130 and a second groove 132.

A picker mechanism 140 is mounted at the end of arm 142. The picker assembly may be of any suitable type adapted to selectively engage or release microfilm slide 100, for example, that disclosed in U.S. Patent 3,055,522.

Arm 142 is mounted for rotation on shaft 144, and spring 146 urges arm 142 to rotate about shaft 144 so as to rest against detent stop 148. A cam 150 is mounted on shaft 152, and shaft 152 is affixed to, and may be rotated by, motor 154. As cam 150 is so rotated, it presses against cam follower 156 and causes arm 142 to be rotated about axis 144 in a clockwise direction. After the high point of cam 150 passes cam follower 156, the cam allows spring 146 to rotate arm 142 in a counterclockwise direction about axis 144.

Referring to FIG. 5, the outputs from voice recognition circuitry 12 are connected to register 160, the outputs of which are connected to comparator 162. Also connected to comparator 162 are the outputs of counter 164. Signals from voice recognition circuitry 12 operate register 160 to an indicated value, thereby producing signals on selected output lines. The comparator 162 compares the output of register 160 with that of counter 164 and maintains a D.C. signal on line 170 as long as the outputs of register 160 and counter 164 do not match. The output on line 170 energizes relay coil 172 so as to operate contact 174, thereby energizing stepping motor 118. Stepping motor 118 will operate stepping drum 110 from position to position about the axis of center post 112 as long as contact 174 is closed. Each step of stepping motor 118 provides a signal on line 180, thereby advancing counter 164 one position for each such step.

Upon the output of counter 164 agreeing with that of register 160, comparator 162 will indicate a "matched" condition. This will de-energize relay coil 172, thereby stopping stepping motor 118. Simultaneously, comparator 162 will provide a D.C. signal on line 190. This signal energizes coil 192, thereby closing contact 194 so as to energize coil 122 and bellcrank 124, as described above. The closing of contact 194 also energizes motor 154, thereby operating arm 142 and picker mechanism 140, as described above.

Thus, in operation, stepping motor 118 is continually stepped until the selected microfilm slide 100 is in position to be projected, and solenoid 122 is then actuated, thereby rotating bell crank 124 so that tooth 126 is mated with gear 120 to thereby accurately position and rigidly hold drum 110.

When drum 110 has been properly positioned and locked, motor 154 rotates cam 150 in the clockwise direction about axis 152 for one complete cycle. As cam 150 rotates, cam follower 156 is first depressed, thereby rotating arm 142 clockwise about axis 144 against the tension force of spring 146. As arm 142 reaches the bottom of its stroke, picker mechanism 140 engages slide 100. Then, as cam 150 continues to rotate, cam follower 156 allows spring 146 to rotate arm 142 in a counterclockwise direction about axis 144. In this manner, arm 142 and picker 140 withdraw slide 100 from drum 110 upward along guides 130 and 132. As cam 150 completes its one revolution, spring 146 draws arm 142 upward until it is stopped by detent 148. With the arm thus positioned, picker mechanism 140 and guides 130 and 132 hold slide 100 in proper position and alignment for projection of the microimages thereon.

Light rays from projection bulb 200 are transmitted by lens 202 onto microfilm slide 100. Lens unit 204 focuses the resultant keyboard image 214, shown in FIG. 8, onto glass sheet 16 in FIG. 1, the light rays being directed to the glass sheet by means of mirrors 206 and 208. The center of the light transmission path is illustrated by dotted line 210.

Referring to FIG. 6, there is shown lens unit 204 in a diagrammatic representation of the arrangement of FIGS. 1 and 2. From this diagram may be seen the projection of the keyboard image, represented by line 210, being reflected from mirrors 206 and 208 toward the keyboard unit where it is reflected from mirror 212 onto glass sheet 16.

The resultant display is a grid having a word, phrase, etc., within each rectangle of the grid. In this manner, the glass sheet 16 and the optical display thereon have the general appearance of a keyboard. However, a key is operated, not by depressing, but merely by touching the surface of the glass sheet toward the center of the area outlined by each rectangle of the grid.

Apparatus to accomplish the above is shown in FIG. 7. Each of the key-representing areas 214 of the keyboard 16 has embedded therein a conductive terminal 216. The control grid 220 of a four-element thyratron tube 225 is connected to the conductive terminal 216.

The conductivity to ground through the human body is relied upon for driving the control grid 220 in tube 225 sufficiently positive to cause the tube to be fired. In order to produce this effect dependably, a two-fold biasing adjustment is provided. The cathode 226 is normally maintained at a potential which is suitably adjusted between two values, the positive limit of which is ground potential and the negative limit of which is the negative voltage of the biasing source 242. The movable tap on rheostat 245 serves this purpose.

The control grid 220 is also maintained at some potential which is negative with respect to the cathode but which is sufficiently close to the threshold of the firing potential so that the tube 225 can be rendered controllable upon touching the key 216. The necessary adjustment is made by means of a rheostat 243 having a movable tap 244. This tap is connected through a grid resistor 241 to the control grid 220 and also to the metallic terminal 216 of the key-representing area 214. The detailed structure and operation of the above keyboard is illustrated in U.S. Patent 2,659,533, by Quimby et al., "Touch-Responsive Keyboard," issued Nov. 17, 1953.

Firing of thyratron 225 energizes relay 223 so as to close contact point 230, thereby establishing a voltage potential which is transmitted by individual wires in cable 30 of FIG 1 to decoder 18.

Each individual wire in cable 30 is connected in decoder 18 to a corresponding photoconductor. Thus, as a key-representing area is touched, the thyratron corresponding to that key is activated, energizing a relay and applying a voltage potential to its corresponding photoconductor.

The outputs of all the photoconductors in decoder 18 are connected together so as to have a common output 32. Since only one of the photoconductors has a voltage potential impressed thereon, any output on line 32 is provided solely by that photoconductor.

Referring to FIGS. 4 and 8, one-half 280 of the image of microfilm 100 projected by lens system 204 is reflected by mirror 300 toward mirror 302. The half 280 of the chip image being so deflected comprises digital data in the form of transparent and opaque areas. These areas are arranged in columns and rows.

Referring to FIGS. 4 and 9, the above portion of the image is reflected from mirror 300 to mirror 302, by mirror 302 onto mirror 304, and then by mirror 304 onto an array of photoconductors 310. Each column of data on slide 100 corresponds to one of the photoconductors in array 310. Motor 320 acts through clutch 322 to rotate shaft 324 and gear 326 in the direction of arrow 328. Gear 326 meshes with a similar gear 330 fixedly mounted on shaft 332. Mirror 302 is also fixedly mounted on shaft 332. Thus, as shaft 324 rotates in the direction of arrow 328, gear 326 causes gear 330 to rotate in the direction of arrow 334. This, in turn, causes shaft 332 and mirror 302 to rotate in the direction of arrow 334 against the tensional force of a spring 336.

Motor 320 is designed so that its shaft rotates continuously in the direction of arrow 328. When a key-representing area 214 of FIG. 7 is touched, the activation of relay 223 operates relay contact 340, which supplies an operating potential to clutch mechanism 322. This potential causes the clutch to engage and begins the rotation of shaft 324 and mirror 302, as shown in FIG. 9. A limit switch 350 is provided which is actuated by the depression of contact 352 by mirror 302. Limit switch 350, as shown in FIG. 7, is connected to relay 354 so that when contact is made, relay coil 354 is energized and opens contact 356. The contact is connected to a series of relays, such as relay 223. This de-energizes the relay 223 which had been activated by thyratron 225. Deactivation of relay 223 releases contacts 230 and 340, thereby removing the potential from the selected photoconductor 310 and de-energizing clutch 322 of FIG. 9. As clutch 322 is released, spring 336 rotates mirror 302 back to its normal position.

When relay 354 opens contact 356, this also serves to extinguish thyratron 225. As mirror 302 is rotated back to its normal position, limit switch 350 is released, thereby de-energizing relay coil 354 and allowing contact 356 to again provide potential to thyratron 225. Since, by this time, the operator has removed his finger from key-representing area 214, thyratron 225 will not be re-energized upon the application of potential by contact 356.

Referring again to FIGS. 1 and 9, the rotation of mirror 302 by motor 320 causes the code image 280 from microfilm chip 100 to be swept vertically across the linear array of photoconductors 310. In this manner, the photoconductor, which had been energized by its associated relay, serially reads the information contained in the associated column of microfilm chip 100.

This data is transmitted over output line 32 to a typewriter 20, as shown in FIG. 1.

An example of such a typewriter is disclosed in U.S. Patent 3,062,537 by James D. Allen, Jr., issued Nov. 13, 1962, and assigned to a common assignee with the subject case. The data is translated by the typewriter of the above patent, and the desired word or words are automatically typed out.

Referring to FIGS. 2 and 7, when relay 354 opened contact 356, it also opened contact 360. This causes deactivation of a logic circuit connected to motor 154, thereby causing motor 154 to rotate cam 150 in the clockwise direction about axis 152 for one complete cycle. As cam 150 rotates, cam follower 156 is depressed, thereby rotating arm 142 clockwise about axis 144 against the tension force of spring 146 so as to gradually lower microfilm slide 100 into grooves 114 and 116 in drum 110. As arm 142 reaches the bottom of its stroke, picker mechanism 140 then releases slide 100. Then, as cam 150 continues to rotate, cam follower 156 allows spring 146 to rotate arm 142 in a counter clockwise direction about axis 144. Spring 146 then draws arm 142 upward until it is stopped by detent 148 in its normal position. Thus, microfilm slide 100 is properly positioned in drum 110 and the entire system is thereby reset. As the operator speaks a second word into microphone 10, the entire system again goes through the complete cycle of operation just described so as to type out the selected word, phrase, etc.

While the invention has been particularly shown and described with reference to a preferred embodiment thereof, it will be understood by those skilled in the art that various changes in form and details may be made therein without departing from the spirit and scope of the invention.

I claim as my invention:

1. Voice actuated apparatus, comprising:
means for analyzing vocal sound waves and providing an output signal in response to said sound waves;
display means for providing, in response to said output signal, visual display of various alpha-numeric items;
means responsive to manual selection of a desired item from among those displayed for producing an actuating signal which is representative of said item; and
responsive means operable in response to said actuating signal.

2. Voice actuated typing apparatus, comprising:
voice responsive means for analyzing voice sound waves and providing an output signal in response to said sound waves;
display means for providing, in response to said output signal, a visual display of various alpha-numeric items;
means responsive to manual selection of a desired item from among those displayed for producing an actuating signal which is representative of said item; and
typing means for typing at least one character in response to said actuating signal.

3. Voice actuated apparatus, comprising:
voice recognition means for analyzing voice sound waves and providing an output signal in response to said analysis;
a plurality of intelligence bearing means, each having a plurality of items represented therein;
selection means for selecting one of said plurality of intelligence bearing means in response to said output signal;
projection means for projecting a visual display of the items represented in said selected intelligence bearing means; and
means responsive to manual selection of a desired item from among those displayed for producing an actuating signal which is representative of said item.

4. Voice actuated apparatus, comprising:
voice recognition means for analyzing vocal sound waves and providing an output signal in response to said analysis;
a plurality of photographic units, each having a plurality of items represented thereon;
selection means for selecting one of said plurality of photographic units in response to said output signal;
projection means for projecting a visual display of said selected photographic unit;
means responsive to manual selection of a desired item from among those displayed for producing an actuating signal which is representative of said item; and
means responsive to said actuating signal for providing an operation in accordance therewith.

5. Voice actuated typing apparatus, comprising:
voice recognition means for analyzing vocal sound waves and providing an output signal in response to said analysis;
a plurality of microfilm portions, each having a plurality of items represented thereon;
selection means for selecting one of said plurality of microfilm portions in response to said output signal;
projection means for projecting a visual display of said selected microfilm portion;
means responsive to manual selection of a desired item from among those displayed for producing an actuating signal representative of said item; and
typing means for typing at least one character in response to said actuating signal.

6. Voice actuated apparatus, comprising:
voice recognition means for analyzing voice sound waves and providing an output signal in response to said analysis;
a plurality of microfilm slides, each having thereon a plurality of representations of various items and a plurality of sets of digital data, each of said sets corresponding to one of said item representations;
selection means for selecting one of said plurality of slides in response to said output signal;
projection means for providing a visual display of the portion of said selected slide having said item representations thereon; and
decoding means responsive to manual selection of a desired item from those displayed for detecting the set of digital data on said selected slide corresponding to the desired item and providing a digital output representative of said set of digital data.

7. Voice actuated apparatus, comprising:
voice recognition means for detecting and analyzing characteristics of voice sound waves to determine the predominant characteristics of said sound waves and providing an output signal in response to said analysis;
a plurality of intelligence bearing units, each having thereon a plurality of representations of various items and a plurality of sets of digital data, each of said sets corresponding to one of said item representations;
selection means for selecting one of said plurality of units in response to said output signal;
projection means for providing a visual display of the portion of said selected unit having said item representations thereon;
decoding means responsive to manual selection of a desired item from among those displayed for detecting the set of digital data on said selected unit corresponding to said manual selected item and providing a digital output representative of said set of digital data; and
responsive means operable in response to said digital output.

8. Voice actuated typing apparatus, comprising:
voice recognition means for detecting and analyzing characteristics of voice sound waves and providing a first output signal in response to said analysis;
a plurality of microfilm slides, each having thereon a plurality of representations of various items and a plurality of groups of digital data, each of said groups corresponding to one of said item representations;
selection means for selecting one of said plurality of slides in response to said output signal;
projection means for providing a visual display of the portion of said selected slide having said item representations thereon;
decoding means responsive to manual selection of a desired item from among those displayed for detecting the group of digital data on said selected slide corresponding to said manually selected item and providing a second output signal representative of said group of digital data; and
typing means for typing at least one character in response to said second output signal.

9. A speech recognition system for resolving and interpreting vocal utterances, comprising:
sound analyzing means for detecting and analyzing characteristics of voice sound waves to determine the predominant characteristics of said sound waves and providing a first output signal in response to said analysis;
a plurality of intelligence bearing means, each having thereon a plurality of sets of human-readable intelligence and a plurality of sets of machine-readable intelligence, each of said sets of machine-readable intelligence corresponding to one of said sets of human-readable intelligence;
selection means for selecting one of said plurality of intelligence bearing means in response to said first output signal;
means for providing a human-readable display of said sets of human-readable intelligence of said selected intelligence bearing means;
keyboard means for manually selecting a desired set of human-readable intelligence from among those displayed;
reading means responsive to actuation of said keyboard for reading the set of machine-readable intelligence on said selected intelligence bearing means corresponding to said keyboard and providing a second output signal representative of said machine-readable intelligence; and
responsive means operable in response to said second output signal.

10. Voice actuated apparatus, comprising:
voice recognition means for detecting and analyzing characteristics of voice sound waves to determine the predominant characteristics of said sound waves and providing an output signal on a selected one of a plurality of output lines in response to said analysis;
intelligence storage means storing therein a plurality of representations of various items in a plurality of sets of digital data, each of said sets corresponding to one of said item representations;
access means for selectively accessing portions of said intelligence storage means;
selection means connected to said plurality of output lines and responsive to said output signal to operate said accessing means to access the portion of said intelligence storage means corresponding to said output line upon which said output signal appears, said portion including a group of said plurality of item representations and a corresponding group of said sets of digital data;
presentation means for providing a human-understandable presentation of the item representations of said accessed group;

keyboard means having a plurality of key-representing areas, each of said key representing areas corresponding to one of said presented human-readable item representations, said keyboard means having a plurality of output lines, each line corresponding to one of said key-representing areas and providing an output signal upon manual operation of said corresponding key-representing area;

reading means connected to each of said keyboard output lines and responsive to the first output signal appearing on any of said lines for reading the set of digital data on said accessed group corresponding to the item representation that corresponds to the keyboard output line upon which said output signal appears, and providing a digital output representative of said set of digital data; and responsive means operable in response to said digital output.

11. Voice actuated apparatus, comprising:

voice recognition means having a plurality of output lines for detecting and analyzing characteristics of voice sound waves to determine the predominant characteristics of said sound waves and providing an output signal on the one of said output lines corresponding to the predominant characteristics so determined;

a plurality of microfilm slides, each having thereon a plurality of representations of various items and a plurality of sets of digital data, each of said sets corresponding to one of said item representations;

selection means, connected to said voice recognition output lines, for selecting the one of said plurality of slides corresponding to said one of said voice recognition output lines in response to said output signal;

a keyboard having a plurality of key-representing areas and having a plurality of output lines, each of said output lines being connected to one of said key-representing areas, said keyboard adapted to sense the touching of any key-representing area and to provide an output signal in response thereto on the output line corresponding to said touched key-representing area;

projection means for providing a visual display on said keyboard of the portion of said selected slide having said item representations thereon, wherein each of said item representations is displayed at a corresponding one of said key-representing areas;

reading means connected to said keyboard output lines and responsive to the first output pulse appearing on any of said keyboard output lines for detecting the keyboard output line upon which said output pulse appears and reading the set of digital data on said selected slide corresponding to said keyboard output line and providing a digital output representative of said set of digital data; and responsive means operable in response to said digital output.

References Cited

UNITED STATES PATENTS

| | | | |
|---|---|---|---|
| 3,271,738 | 9/1966 | Kamentsky | 340—146.3 |
| 3,166,640 | 1/1965 | Dersch. | |
| 3,202,761 | 8/1965 | Bibbero. | |
| 2,708,688 | 5/1955 | Kalfaian. | |
| 2,685,615 | 8/1954 | Biddulph et al. | |

KATHLEEN H. CLAFFY, *Primary Examiner.*

R. P. TAYLOR, *Assistant Examiner.*